(12) United States Patent
Fluckiger

(10) Patent No.: US 9,823,350 B2
(45) Date of Patent: Nov. 21, 2017

(54) LINEAR MODE COMPUTATIONAL SENSING LADAR

(71) Applicant: Raytheon Company, Waltham, MA (US)

(72) Inventor: David U. Fluckiger, Allen, TX (US)

(73) Assignee: Raytheon Company, Waltham, MA (US)

( * ) Notice: Subject to any disclaimer, the term of this patent is extended or adjusted under 35 U.S.C. 154(b) by 504 days.

(21) Appl. No.: 14/448,465

(22) Filed: Jul. 31, 2014

(65) Prior Publication Data

US 2016/0033642 A1    Feb. 4, 2016

(51) Int. Cl.

| G01S 17/02 | (2006.01) |
|---|---|
| G01S 17/06 | (2006.01) |
| G01S 17/89 | (2006.01) |
| G02B 26/08 | (2006.01) |
| G01S 17/10 | (2006.01) |
| G01S 7/481 | (2006.01) |
| G01S 7/486 | (2006.01) |

(52) U.S. Cl.
CPC ........... G01S 17/026 (2013.01); G01S 7/486 (2013.01); G01S 7/4816 (2013.01); G01S 17/06 (2013.01); G01S 17/10 (2013.01); G01S 17/89 (2013.01); G02B 26/0833 (2013.01)

(58) Field of Classification Search
CPC ................................. G01T 1/202; H03M 1/50
See application file for complete search history.

(56) References Cited

U.S. PATENT DOCUMENTS

| 7,271,747 B2 | 9/2007 | Baraniuk et al. |
| 7,511,643 B2 | 3/2009 | Baraniuk et al. |
| 7,783,459 B2 | 8/2010 | Rozell et al. |
| 8,199,244 B2 | 6/2012 | Baraniuk et al. |
| 2011/0260036 A1 | 10/2011 | Baraniuk et al. |
| 2013/0088726 A1 | 4/2013 | Goyal et al. |

FOREIGN PATENT DOCUMENTS

EP    2755327    7/2014

OTHER PUBLICATIONS

Candes, et al.; "Robust Uncertainty Principles: Exact Signal Reconstruction from Highly Incomplete Frequency Information," IEEE TIT; Feb. 2006; vol. 52, No. 2; pp. 489-509.*

(Continued)

Primary Examiner — Luke Ratcliffe

(57) ABSTRACT

Laser light pulsed to illuminate and reflect from at least one object is received at a digital micro-mirror device including an array of mirrors each of which may be selectively controlled to be oriented to either reflect incident light onto a detector or not. The detector outputs a signal representative of an amount of light sensed. By applying M spatial patterns to the mirrors, each in synchronization with one pulse from the laser, and storing sampled signal values from the detector output at each of K times following a pulse from the laser, the collected information may be used to reconstruct K images each using all M spatial patterns and stored sampled signal values corresponding to a respective one of the K times. Each of the K images corresponds to a different range to the digital micro-mirror device, such that the system may be employed as a range finder.

20 Claims, 4 Drawing Sheets

(56) References Cited

OTHER PUBLICATIONS

International Search Report and Written Opinion issued for PCT/US2015/032930 dated Jan. 5, 2016, 13 pgs.
Colaco A. et al., "Compressive Depth Map Acquisition Using a Single Photon-Counting Detector: Parametric Signal Processing Meets Sparsity", Computer Vision and Pattern Recognition (CVPR), 2012 IEEE Conference on, IEEE, Jun. 16, 2012, pp. 96-102.
Ahmed Kirmani et al., "Exploiting Sparsity in Time-Of-Flight Range Acquisition Using a Single Time-Resolved Sensor", Optics Express, vol. 19, No. 22, Oct. 24, 2011, Series 21485-21507.
Duarte Marco F. et al., "Single-Pixel Imaging via Compressive Sampling", IEEE Signal Processing Magazine, IEEE Service Center, Piscataway, NJ., U.S., vol. 25, No. 2, Mar. 1, 2008, pp. 83-91.
Candès, et al.; "Robust Uncertainty Principles: Exact Signal Reconstruction from Highly Incomplete Frequency Information," IEEE TIT; Feb. 2006; vol. 52, No. 2; pp. 489-509.
Duarte, et al.; "Single Pixel Imaging via Compressive Sampling, Signal Processing Magazine"; IEEE SPM; Mar. 2008; vol. 25, No. 2; pp. 83-91.
Carron; "Nuit Blanche: CS"; at least as early as Jul. 3, 2014; http://nuit-blanche.blogspot.com/search/label/CS; 26 pp.
Tao; "Compressed Sensing and Single-Pixel Cameras"; Apr. 13, 2007; http://terrytao.wordpress.com/2007/04/13/compressed-sensing-and-single-pixel-cameras/; 30 pp.
Carron; "Compressive Sensing: The Big Picture"; at least as early as Jul. 2013; https://sites.google.com/site/igorcarron2/cs; 22 pp.
Chesney Research; "What's Compressive Sensing?"; at least as early as Jun. 22, 2013; http://www.chesneyresearch.org/compsense.html; 4 pp.
Romberg; "Imaging via Compressive Sampling"; IEEE SPM; Mar. 2008; pp. 14-20.
Candes, et al.; "An Introduction to Compressive Sampling"; IEEE SPM; Mar. 2008; pp. 21-30.
Candes; "Compressive Sampling"; European Mathematical Society; Proceedings of Intl. Congress of Mathematicians; Madrid, Spain; 2006; 20 pp.
Herman; "Compressive Sensing with Partial-Complete, Multiscale Hadamard Waveforms"; Imaging and Applied Optics; 2013; 3 pp.

\* cited by examiner

LINEAR MODE COMPUTATIONAL SENSING LADAR

TECHNICAL FIELD

The present disclosure is directed in general to laser radar sensors, and more particularly, to improving linear mode laser radar sensors.

BACKGROUND OF THE DISCLOSURE

Imaging laser radar (LADAR) focal plane sensors have limitations on pixel size and format (total number of pixels) based on the large amount of circuitry required beneath each pixel. This is true for both linear mode arrays and Geiger mode arrays. In addition, linear mode LADAR focal plane arrays are limited to either first pulse or last pulse logic, while many pulses are required to develop detection statistics for Geiger mode (GM) arrays.

There is, therefore, a need in the art for very high spatial resolution, large format imaging LADAR with full temporal bandwidth, preferably including full pulse return sampling for obscured target and/or foliage penetration (FOPEN) applications. This LADAR capability is enabled by the present disclosure using a single-pixel camera paradigm.

SUMMARY OF THE DISCLOSURE

Laser light is pulsed from a laser to illuminate at least one object and laser light reflected from the at least one object is received at a digital micro-mirror device including an array of mirrors each of which may be selectively controlled to be oriented in one of a first direction and a second direction. A detector positioned so that mirrors within the digital micro-mirror device oriented in the first direction reflect incident light onto the detector and mirrors within the digital micro-mirror device oriented in the second direction do not output a signal representative of an amount of light incident on the detector. By applying M spatial patterns to the mirrors of the digital micro-mirror device, each of the M spatial patterns in synchronization with one pulse from the laser, and, for each of the M spatial patterns, storing sampled signal values from the output of the detector at each of K times following a pulse from the laser, the collected information may be used to reconstruct K images of the at least one object each using all M spatial patterns and stored sampled signal values corresponding to a respective one of the K times. Each of the K images corresponds to a different target range to the digital micro-mirror device, such that the system may be employed as a range finder.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
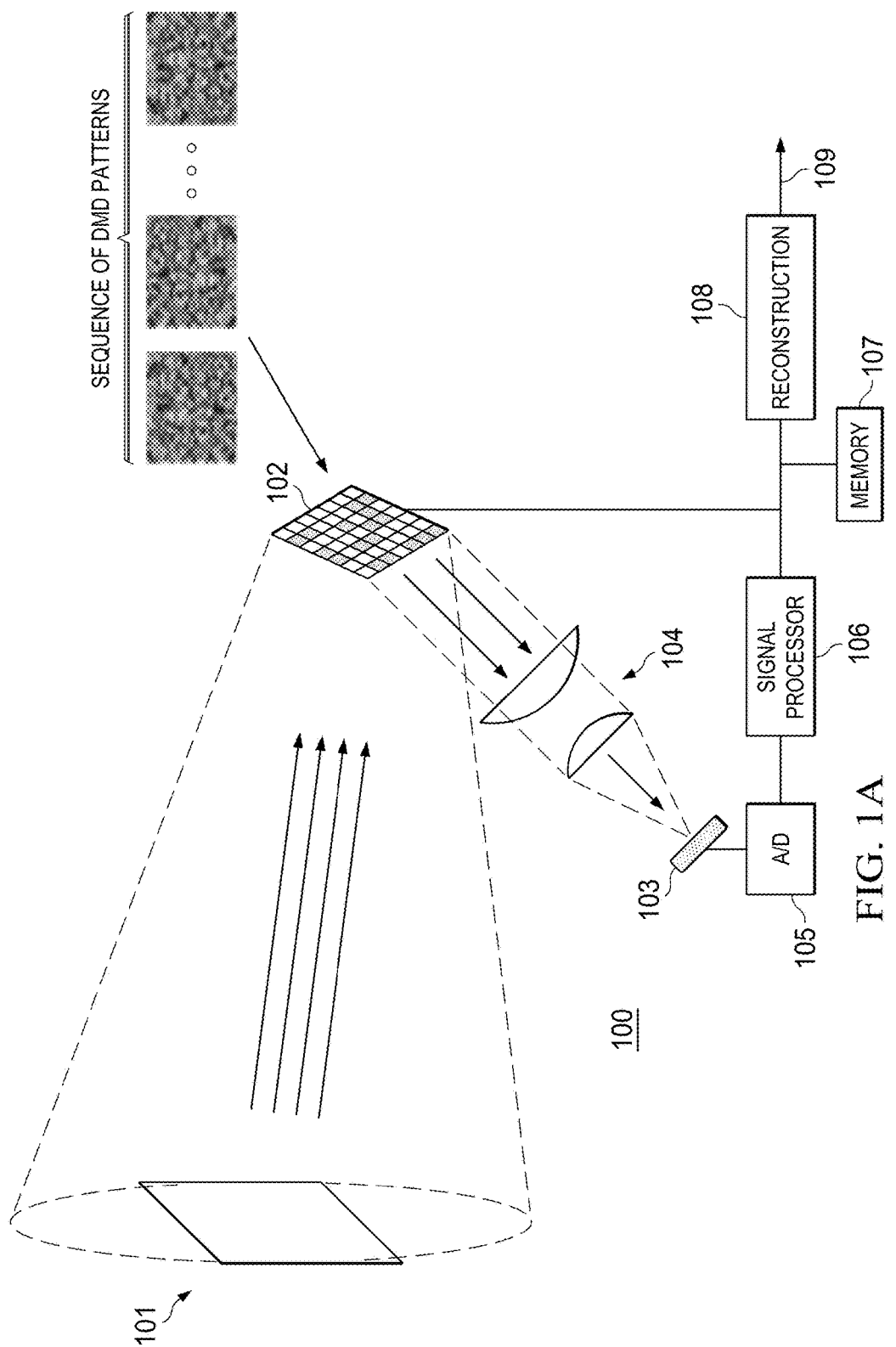
FIG. 1A illustrates a single pixel imaging camera system via compressive sampling.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Additionally, unless otherwise specifically noted, articles depicted in the drawings are not necessarily drawn to scale.

When used for ranging applications, imaging LADAR focal plane array (FPA) technology in read-out integrated circuit (ROIC) design requires a range receiver under every pixel, requiring large pixel sizes and limiting array sizes for both Gieger mode and linear mode LADAR FPAs. Current Geiger mode LADAR FPAs require a range clock under each pixel and are limited to 50 micron (μm) pixel size, and 32×128 pixel formats (and are also single photon sensitive and nonlinear). Existing linear mode arrays come in 100 micron pixel size, 128×128 and 40 micron pixel size, 256×256 formats, and are also limited to first pulse/last pulse logic such that significant development is required to give the N-pulse logic return required for FOPEN type applications.

For one computational sensing demonstration experiment using a large format DMD as the spatial modulator and a GM-detector, image reconstruction was limited to 64×64 pixels, and the GM-sensor required a very high repetition— 100 mega-Hertz (MHz)—laser with a 1.5 meter (m) ambiguity range.

In the present disclosure, linear mode full temporal bandwidth high definition (HD) format LADAR is enabled using the single-pixel (or few pixel) camera paradigm. Using a large format digital micro-mirror device (DMD), spatial resolution (pixel pitch) of 6.5 microns with 720p image formats are available. DMDs can be switched at up to 40 KHz frame rates. For single pixel operation, the entire (spatially filtered) image light reflected from the DMD is collected on a low noise avalanche photodiode (APD), which is temporally sampled synchronously with the laser pulse. Thus, each time sample corresponds to light coming from a specific range in object space. Repeating this operation for some number of distinct spatial patterns allows one to reconstruct object space as a function of range. Experience demonstrates that sampling between 10% and 20% of the total number of pixels (the compression ratio) is sufficient to reconstruct the entire scene. Thus, for example, 10% of 720p is 13.8K spatial patterns. Using a 20 KHz laser with ambiguity at 1.5 kilometer (km) as the illuminator leads to a 4.6 second image formation rate (limited by data collection). However, using a small format array allows one to collect the DMD light in parallel, by partitioning the image plane—that is, grouping subsets of the mirrors in the DMD to all operate in the same manner, so that the detector array effectively has fewer elements than the number of DMD mirrors. Using a 9×12 detector array gives a speed increase factor of 96, which allows one to operate a full temporal bandwidth HD LADAR at full motion video rates.

Figure 1B:
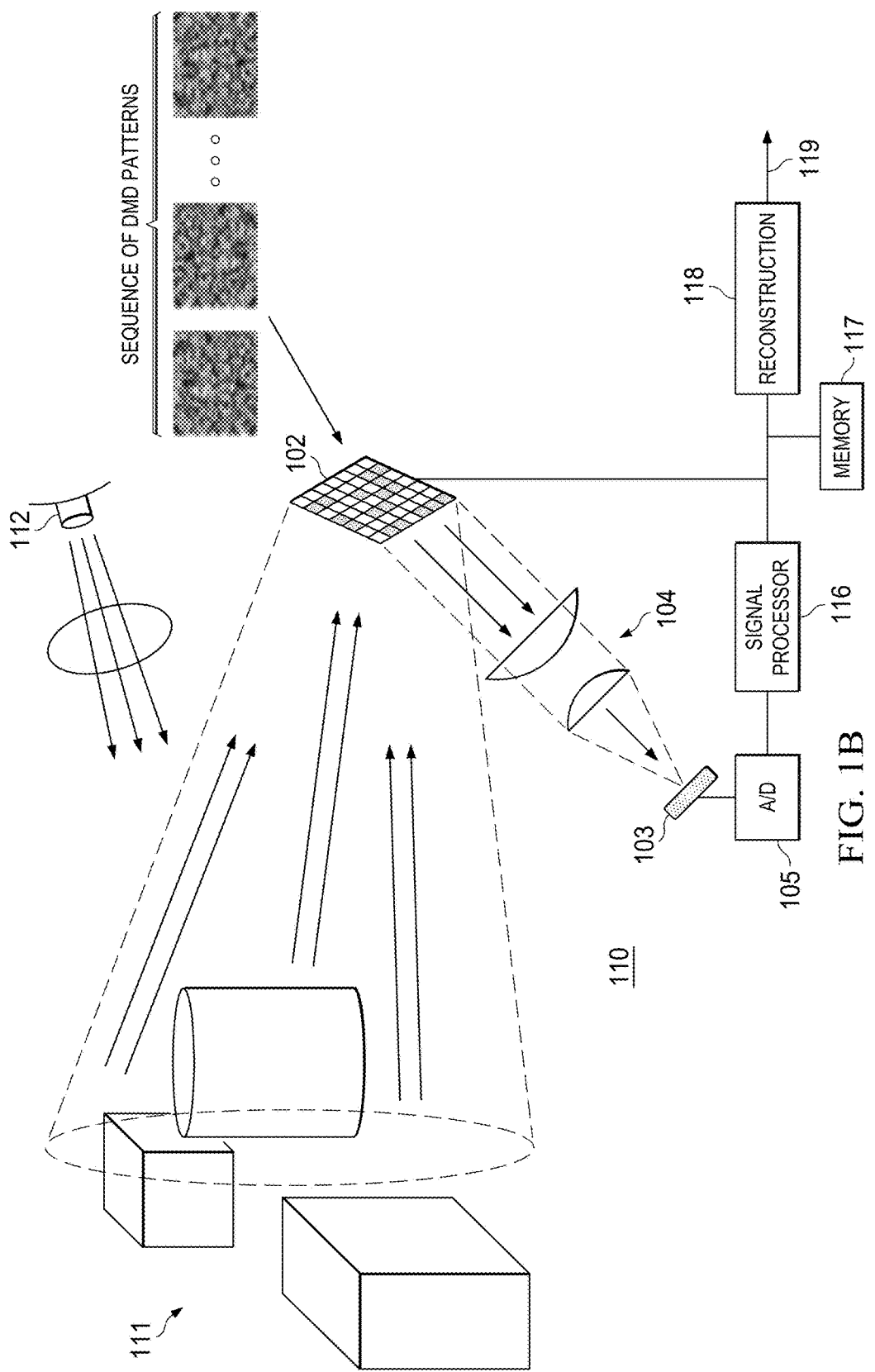
FIG. 1B illustrates use of single pixel imaging via compressive sampling in implementing a linear mode computation sensing LADAR system in accordance with an embodiment of the present disclosure.

FIGS. 1A and 1B are diagrams comparatively illustrating the structure and operation of a linear mode computation sensing LADAR system in accordance with embodiments of the present disclosure. FIG. 1A illustrates a single pixel imaging camera system via compressive sampling. A single pixel imaging system 100 attempts to capture a two dimensional image 101 of a scene via a digital micro-mirror device (DMD) 102. The DMD 102 has an array of mirrors that are "flipped" or caused to be oriented in either one direction or another, so that light impinging on the respective mirror is either reflected toward a single element (photo) detector 103 or away from that detector 103. The DMD 102 may include, for example, an array of 1024×768 individuals mirrors, each of which may be selectively oriented in at least a first direction (e.g., +12° from the perpendicular to the array) oriented toward a source of incident light ("on"), and a second, different direction (e.g., −12° from the perpendicular to the array) oriented away from the source of incident light ("off"). Preferably an internal controller within the DMD 102 controls the orientation of all mirrors in the array—that is, the "spatial pattern," which is the particular configuration of which mirrors are oriented in a first direction and which are oriented in a second, different direction. Mirrors oriented in the first direction reflect incident light onto the detector 103, while mirrors oriented in the second direction do not. The DMD 102 preferably includes an internal controller controlling the spatial pattern and an internal memory storing the spatial pattern at a given time. The structure and operation of a suitable DMD 102 is described, for example, in "DMD 101: Introduction to Digital Micromirror Device (DMD) Technology," Texas Instruments Application Report DLP0008 (July 2008).

The spatial pattern is preferably random, so that the pattern of reflected light from the scene 101 is also random. That is, incident light from some randomly-selected subset of mirrors within the array of DMD 102 is reflected toward the single element detector 103, passing through, for example, a biconvex or condenser lens system 104 that focuses all of the reflected light onto the single element of detector 103 while incident light from the remaining mirrors within DMD 102 is reflected away from the detector 103. The output (amplitude or magnitude) of detector 103, corresponding to the amount of light from the scene 101 that is reflected by DMD 102 toward the detector rather than away, is then sampled by the analog-to-digital (A/D) device 105, which stores and/or reports such outputs at specific times. A different spatial pattern is then applied to DMD 102 and another sample of the output of A/D device 105 is taken, and the process is repeated M times for each of M random DMD spatial patterns, obtaining a sequence of M amplitudes taken by A/D device 105 from the output from the single element detector 103 corresponding to M DMD spatial patterns, collectively representative of the two dimensional image 101 of the scene being photographed.

The M amplitudes of the output from detector 103 are then processed by a signal processor 106 and stored in memory 107, and are employed by reconstruction unit 108 to generate, based on the M random DMD spatial patterns, an image 101 of the scene at output 109. Signal processor 106, memory 107 and reconstruction unit 108 collectively form a processing system that includes one or more processors (including signal processor 106) and one or more memories (including memory 107) in accordance with the known art. A control system for the single pixel imaging system 100 is formed by that processing system in combination with controllers (whether internal or external) for DMD 102, detector 103 and A/D device 105 operating collaboratively in conjunction with each other. In addition, the process of generating an image of the scene 101 using the M output amplitudes of single element detector 103 and the corresponding M random spatial patterns applied to DMD 102 is known in the art.

FIG. 1B illustrates use of similar single pixel imaging via compressive sampling in implementing a linear mode computation sensing LADAR (CS-LADAR) system 110 in accordance with an embodiment of the present disclosure. Such a system might be employed, for example, in rangefinding as part of a targeting and/or guidance system for airborne delivery of projectiles or missiles, or for developing a range image for navigation purposes. Those skilled in the art will recognize that a complete structure and operation of all components for a CS-LADAR system 110 is not depicted in the drawings or described herein. Instead, for simplicity and clarity, only so much of the components and their respective operation as is unique to the present disclosure or necessary for an understanding of the present disclosure is depicted and described. The processing system for CS-LADAR system 110, collectively formed by one or more processors (including signal processor 116), one or more memories (including memory 117), and reconstruction unit 118, may be similar to the processing system for the single pixel imaging system 100, but is programmed differently as described in further detail below. Likewise a control system for CS-LADAR system 110, formed by the processing system in combination with controllers (whether internal or external) for DMD 102, detector 103 and A/D device 105 operating collaboratively in conjunction with each other, operates in the manner described below.

The CS-LADAR system 110 attempts to identify the range to various objects within a three-dimensional scene 111. The three-dimensional scene 111 is illuminated with pulsed light from a laser 112 that illuminates the full field of view (FOV). A DMD 102, detector 103, lens system 104, and A/D device 105 are included and operate generally as described above, except that the output of A/D device 105 is sampled more frequently, as discussed in further detail below. Likewise a signal processor 116, memory 117 and reconstruction unit 118 are generally connected as described above between the A/D device 105 and the output 119, and form a processing system.

For single pixel imaging via compressive sampling as discussed above in connection with FIG. 1A, each A/D output sample corresponds to one DMD spatial pattern—that is, sampling from the output of A/D device 105 is run at the same rate as the DMD rate so that one output amplitude sample is obtained per spatial pattern. In the CS-LADAR system 110 illustrated in FIG. 1B, the laser 112 is pulsed with a single DMD spatial pattern employed for the duration of each pulse (one laser pulse per spatial pattern), and the sampling from the A/D device 105 is synched to the laser pulses. However, for each laser pulse and associated DMD spatial pattern, many samples of the output from the A/D device 105 are recorded in time, corresponding to different times of arrival of light from the laser 112 reflected off the objects in the three-dimensional scene 111 and thus to range "slices" of object space. Thus, for example, sampling from the A/D device output may be at a mega-Hertz (MHz) rate, compared to kilo-Hertz (KHz) sampling rates employed for single pixel imaging via compressive sampling.

Figure 2:
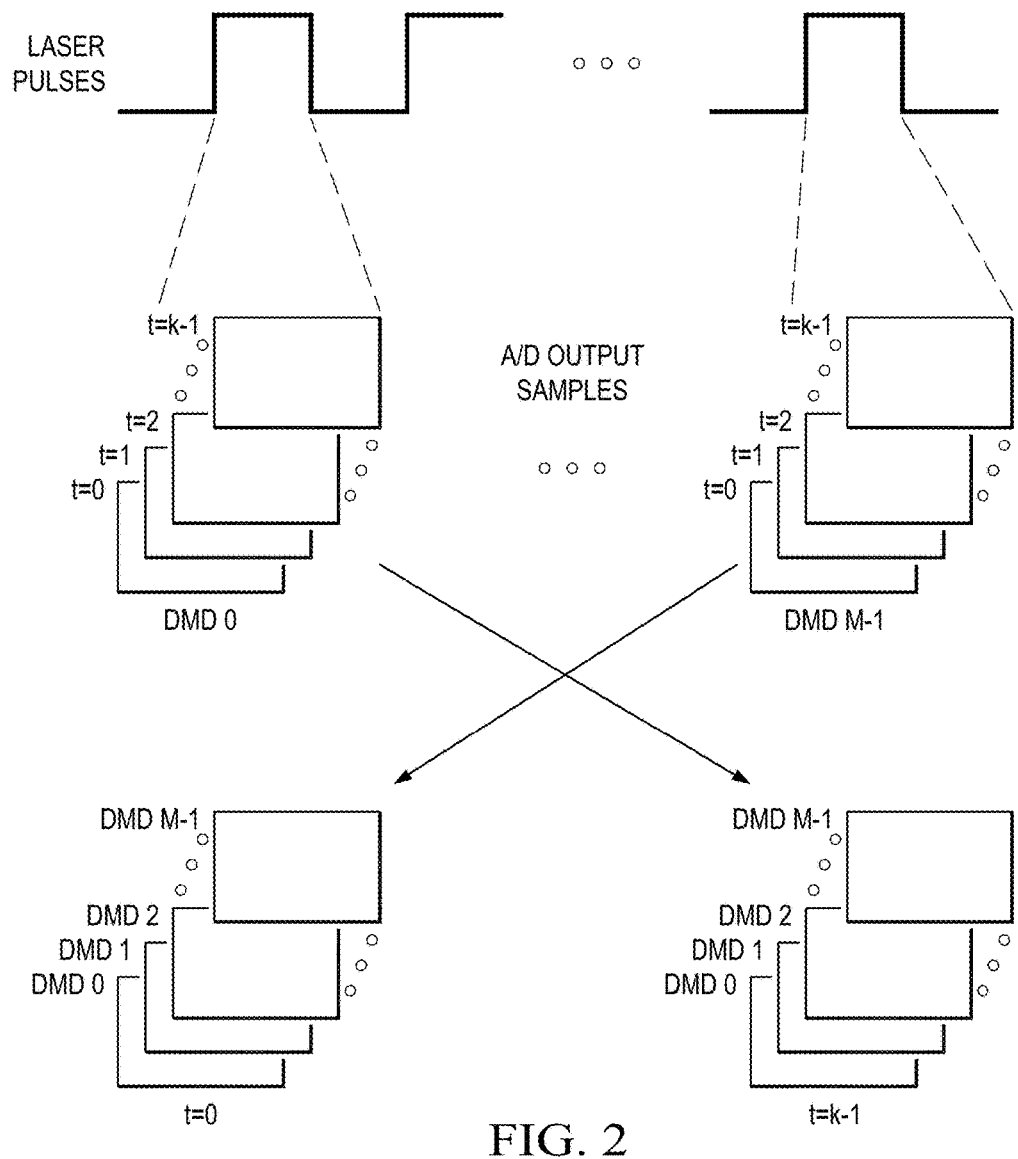
FIG. 2 illustrates the single pixel imaging output sampling in implementing a linear mode computation sensing LADAR system in accordance with an embodiment of the present disclosure.

FIG. 2 illustrates the single pixel imaging output sampling in implementing a linear mode CS-LADAR system 110 in accordance with an embodiment of the present disclosure. For each DMD spatial pattern (0 to M−1), a time history (vector) of the laser return is sampled by K samples (at t=0, 1 . . . k−1) of the A/D device output. This collects K time slices for each of the M spatial patterns, which may be logically treated as separate image data sets as shown at the bottom of FIG. 2. For each of the k time slices, reconstruction then follows as described above for all M DMD spatial patterns—that is, the M samples for t=0 are used to reconstruct one image, the M samples for t=1 are used to reconstruct a second image, etc. up to and including the M samples for t=k−1. The result is a set of K image slices corresponding to individual range slices, or the image of laser energy that was returned at each particular range. The K image slices may then be searched for the object of interest using techniques known in the art, and thus employed to identify the range to the object of interest by noting the range of the image slice in which the object of interest is found.

Those skilled in the art will recognize that the timing of the collection of K samples from the output of A/D device 105 may be offset from the start of a corresponding pulse from laser 112, to allow for travel time for light from the laser 112 to the objects 111 and back to DMD 102. Moreover, the timing of samples taken from the output of A/D device 105 may be selected based on a predetermined limit of ranges to be measured (both ranges that are "too close" and those that are "too far").

Figure 3:
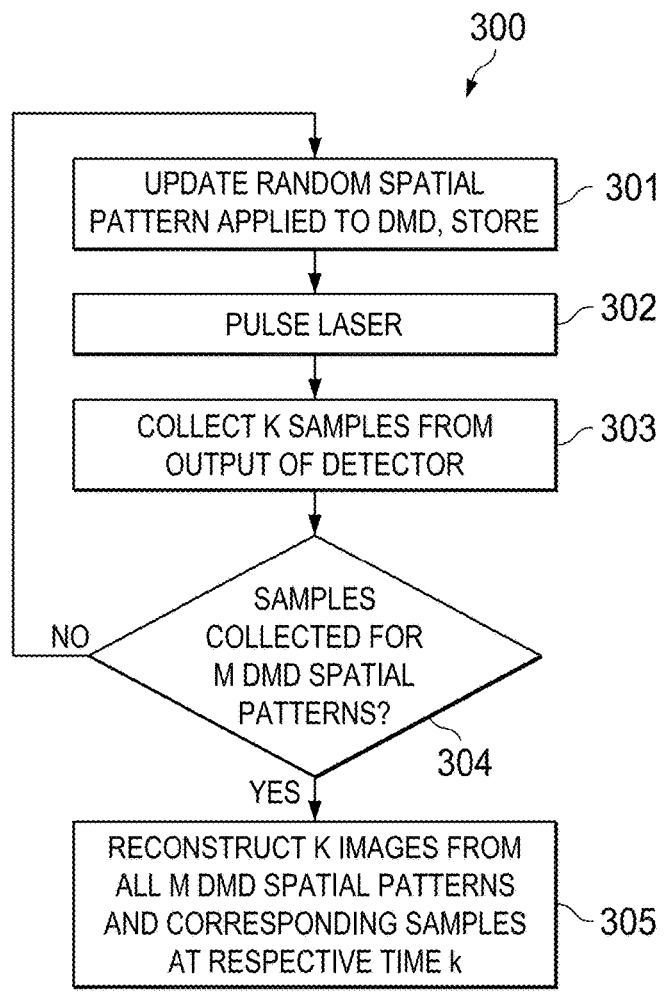
FIG. 3 is a high level flowchart for a process of operating a linear mode computation sensing LADAR system in accordance with embodiments of the present disclosure.

FIG. 3 is a high level flowchart for a process of operating a linear mode computation sensing LADAR system in accordance with embodiments of the present disclosure. The process is performed within the control system (and the processing system therein) for CS-LADAR system 110 described above in connection with FIG. 1B. While the flow chart depicts a series of sequential steps, unless explicitly stated no inference should be drawn from that sequence regarding specific order of performance, performance of the steps in series rather than concurrently or in an overlapping manner, or performance exclusively without the occurrence of intervening or intermediate steps. Moreover, those skilled in the art will recognize that a complete process is not illustrated or described. Instead, for simplicity and clarity, only so much of the respective processes as is unique to the present disclosure or necessary for an understanding of the present disclosure is depicted and described.

The process 300 begins by updating the random spatial pattern applied to the mirror array of DMD 102 (step 301), and pulsing the laser 112 (step 302). K samples are then collected from the output of the detector 103, via A/D device 105 (step 303), each at a different instant 0 through k following the triggering of the laser pulse. A determination is then made as to whether samples have been collected for M spatial patterns and laser pulses (step 304), and if not the process returns to step 301. If so, however, K images are reconstructed (step 305), each from all M DMD spatial patterns and the corresponding sampled detector outputs at time k.

Additional processing such as search of the K images for an object matching a predetermined pattern may then optionally be performed. For example, a sighting or targeting reticle may be used to identify an object or objects of interest within a field of view. A search of the K images for the pattern(s) so identified may be conducted, with the ranges corresponding to matching image(s) noted as the range(s) to the object(s). The search may be conducted in parallel or in an overlapping manner with the reconstruction, with the reconstruction terminated early (i.e., fewer than all K images reconstructed) if the object(s) of interest are found.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. §112(f) unless the words "means for" or "step for" are explicitly used in the particular claim.

What is claimed is:

1. An apparatus, comprising:
    a laser configured to pulse laser light illuminating at least one object;
    a digital micro-mirror device oriented to receive laser light reflected from the at least one object and including an array of mirrors each of which may be selectively controlled to be oriented in one of a first direction and a second direction;
    a detector positioned so that mirrors within the digital micro-mirror device oriented in the first direction reflect incident light onto the detector and mirrors within the digital micro-mirror device oriented in the second direction do not, the detector configured to output a signal representative of an amount of light incident on the detector; and
    a control system configured to apply M spatial patterns to the mirrors of the digital micro-mirror device, each of the M spatial patterns in synchronization with a corresponding pulse from the laser, and, for each of the M spatial patterns, to store sampled signal values from the output of the detector at each of K times following the corresponding pulse from the laser,
    wherein the control system includes a processing system configured to reconstruct K images of the at least one object each using all M spatial patterns and stored sampled signal values corresponding to a respective one of the K times,
    wherein the processing system is configured to search the K images for an object of interest among objects including the at least one object.

2. The apparatus according to claim 1, further comprising an analog-to-digital device configured to selectively sample the output of the detector.

3. The apparatus according to claim 1, wherein the M spatial patterns applied to the mirrors of the digital micro-mirror device are random patterns.

4. The apparatus according to claim 1, wherein one of the K images reconstructed using stored sampled signal values corresponding to a time k within the K times corresponds to a predetermined range from the digital micro-mirror device.

5. The apparatus according to claim 1, wherein each of the K images corresponds to a different range from the digital micro-mirror device.

6. The apparatus according to claim 5, wherein the processing system is configured to determine a range to the object of interest based on which of the K images contains the object of interest.

7. The apparatus according to claim 1, wherein each of the stored sampled signal values is associated within a memory of the processing system with an identification of the spatial pattern applied to the digital micro-mirror device at a time k at which the output of the detector was sampled.

8. The apparatus according to claim 7, wherein each of the stored sampled signal values is associated within the memory of the processing system with an identification of the time k.

9. The apparatus according to claim 1, wherein the mirrors within the digital micro-mirror device are partitioned into a 9×12 detector array.

10. The apparatus according to claim 1, wherein between 10% and 20% of a number of pixels are sampled for a spatial resolution desired.

11. A method, comprising:
pulsing laser light from a laser to illuminate at least one object;
receiving laser light reflected from the at least one object at a digital micro-mirror device including an array of mirrors each of which may be selectively controlled to be oriented in one of a first direction and a second direction;
outputting, from a detector positioned so that mirrors within the digital micro-mirror device oriented in the first direction reflect incident light onto the detector and mirrors within the digital micro-mirror device oriented in the second direction do not, a signal representative of an amount of light incident on the detector;
applying M spatial patterns to the mirrors of the digital micro-mirror device, each of the M spatial patterns in synchronization with a corresponding pulse from the laser;
for each of the M spatial patterns, storing sampled signal values from the output of the detector at each of K times following the corresponding pulse from the laser;
reconstructing K images of the at least one object each using all M spatial patterns and stored sampled signal values corresponding to a respective one of the K times; and
searching the K images for an object of interest among objects including the at least one object.

12. The method according to claim 11, further comprising selectively sampling the output of the detector with an analog-to-digital device.

13. The method according to claim 11, wherein the M spatial patterns applied to the mirrors of the digital micro-mirror device are random patterns.

14. The method according to claim 11, wherein one of the K images reconstructed using stored sampled signal values corresponding to a time k within the K times corresponds to a predetermined range from the digital micro-mirror device.

15. The method according to claim 11, wherein each of the K images corresponds to a different range from the digital micro-mirror device.

16. The method according to claim 15, further comprising determining a range to the object of interest based on which of the K images contains the object of interest.

17. The method according to claim 11, wherein each of the stored sampled signal values is associated within a memory with an identification of the spatial pattern applied to the digital micro-mirror device at a time k at which the output of the detector was sampled.

18. The method according to claim 17, wherein each of the stored sampled signal values is associated within the memory with an identification of the time k.

19. The method according to claim 11, further comprising partitioning the mirrors within the digital micro-mirror device into a 9×12 detector array.

20. The method according to claim 11, further comprising sampling between 10% and 20% of a number of pixels for a spatial resolution desired.

* * * * *